Oct. 7, 1969  F. JACOBS  3,470,946

AIR-CONDITIONING APPARATUS

Original Filed July 2, 1965  2 Sheets-Sheet 1

INVENTOR.
FRED JACOBS

Oct. 7, 1969 F. JACOBS 3,470,946
AIR-CONDITIONING APPARATUS
Original Filed July 2, 1965 2 Sheets-Sheet

INVENTOR.
FRED JACOBS

United States Patent Office 3,470,946
Patented Oct. 7, 1969

3,470,946
AIR-CONDITIONING APPARATUS
Fred Jacobs, 59 Netto Lane, Plainview, N.Y. 11803
Original application July 2, 1965, Ser. No. 484,495, now Patent No. 3,315,733, dated Apr. 25, 1967. Divided and this application Mar. 1, 1967, Ser. No. 636,559
Int. Cl. F24f 3/00
U.S. Cl. 165—50                              13 Claims

ABSTRACT OF THE DISCLOSURE

An air-conditioning apparatus for conditioning the air within a plurality of enclosures. A heat transfer fluid is selectively passed through either a cooling means or a heating means so as to modify the fluid temperature. The conditioned fluid then flows through various air conditioners in the enclosures.

---

This application is a division of application Ser. No. 484,495, filed on July 2, 1965, and entitled "Air Conditioning Apparatus," now U.S. Patent No. 3,315,733.

The present invention pertains, generally, to air-conditioning apparatus, and, more particularly, to air-conditioning apparatus that is capable of conditioning the air within any one or more of a plurality of enclosures to the desired temperature level in an unusually efficient manner.

It is to be understood, at the outset of this specification, that the terms "air-conditioning", or "conditioning" the air within an enclosure is intended in its broadest possible sense. Specifically, this term or any derivative thereof is intended to mean, for example, heating during the winter months, and cooling during the summer months. Accordingly, air conditioning apparatus constructed in accordance with the principles of the present invention is, as will hereinafter be more fully described, capable of conditioning the air within an enclosure to the desired temperature level regardless of the season, that is, notwithstanding the prevailing ambient conditions.

Air-conditioning apparatus that are presently commercially available, either for industrial uses, or for use in dwelling units, generally fall into two categories. One type of air-conditioning apparatus is the wall unit that is mounted in a wall, or at some other suitable location, and utilizes the ambient air to dissipate the heat of a heat transfer medium flowing through the condenser coil. This type of unit requires ambient air for its operation, and, therefore, must be mounted in an exterior wall. As a result, the air within interior enclosures cannot be directly conditioned, with the exception that such an interior enclosure obtains the benefit of the conditioned air in an adjacent enclosure.

In an other category, what is commonly referred to as "central air conditioning apparatus" comprises one element for heating a heat transfer fluid, for example, water, and an other element for cooling or chilling the heat transfer fluid. This fluid is then pumped through a system of conduits to the enclosures in which the air is to be conditioned. In these enclosures, a unit is installed comprising a coil through which the heated or chilled heat transfer fluid flows, and a fan for drawing the air from within the enclosuree about the coil, and the redelivering the conditioned air into the enclosure. Since this type of apparatus comprises a single unit for chilling the heat transfer fluid during those seasons when it is desired to reduce the temperature level in an enclosure, the pipes, conduits, must be insulated to prevent condensation. This problem becomes more significant when the building, whether it be an industrial establishment, or a dwelling unit, such as a home or apartment unit, is originally constructed with a heating system only. This is true nothwithstanding that the same system of pipes or conduits can be used for heating as well as cooling. The problem is not only the necessary installation of insulation, but the cost of effecting this alteration as well.

Having in mind each and everyone of the foregoing disadvantages, and others that will be readily apparent to those skilled in the art, it is a primary object of the present invention to provide air-conditioning apparatus that is capable of conditioning the air within any one or more of a plurality of enclosures to the desired temperature level in an unusually efficient manner regardless of the season, that is, nothwithstanding the prevailing ambient conditions.

Another primary object of this invention, in addition to the foregoing objects, is to provide air-conditioning apparatus that is capable of conditioning the air within any one or more of a plurality of enclosures, irrespective of whether the enclosure is interiorly or exteriorly located, to the desired temperature level in an unusually efficient manner, regardless of the season, that is, notwithstanding the prevailing ambient conditions, said air conditioning apparatus being constructed and arranged to utilize the same heat transfer fluid, which may be supplied from any suitable source thereof, for heating and cooling and heating or cooling, all in the absence of necessitating the use of ambient air, and insulation for the conduits or pipes through which the heat transfer fluid flows.

Yet another primary object of the present invention, in addition to each and every one of the foregoing objects, is to provide air-conditioning apparatus that is capable of conditioning the air within any one or more of a plurality of enclosures, irrespective of whether the enclosure is interiorly or exteriorly located, to the desired temperature level, in an unusually efficient manner, regardless of the season, that is, nothwithstanding the prevailing ambient conditions, said air conditioning apparatus being constructed and arranged to utilize the same heat transfer fluid, for example, water, which may be supplied from any suitable source thereof; as from a city or other municipal water source, for heating and cooling, all in the absence of necessitating the use of ambient air, and insulation for the conduits or pipes.

A further primary object of this invention, in addition to each and every one of the foregoing objects, is to provide air conditioning apparatus for conditioning the air within any one or more of a plurality of enclosures, irrespective of whether the enclosure is interiorly or exteriorly located, to the desired temperature level in an unusually efficient manner regardless of the season, that is, notwithstanding the prevailing ambient conditions, said air-conditioning apparatus comprising a system of pipes, or conduits, through which a single heat transfer fluid, such as water, from any suitable source thereof flows, a single element for heating and a single element for cooling the heat transfer fluid, said heating and cooling elements being disposed substantially in parallel relationship with respect to one another, and a plurality of air-conditioning units disposed within a corresponding one of said enclosures, each of said units defining a self-contained individually controllable heating and cooling device for conditioning the air within the enclosure to the desired temperature level.

A still further primary object of the present invention, in addition to each and every one of the foregoing objects, is to provide air-conditioning apparatus for conditioning the air within any one or more of a plurality of enclosures, irrespective of whether the enclosure is interiorly or exteriorly located, to the desired temperature level in an unusually efficient manner regardless of the season, that is, notwithstanding the prevailing ambient conditions, said air-conditioning apparatus comprising a system of pipes or conduits, through which a single heat transfer fluid, such as water, from any suitable source thereof flows, a single element for heating and a single element for cooling the heat transfer fluid, said heating and cooling elements being disposed in substantially parallel relationship with respect to one another, and a plurality of air-conditioning units disposed within a corresponding one of said enclosures, each of said units defining a self-contained individually controllable heating and cooling device for conditioning the air within the enclosure to the desired temperature level, and being constructed and arranged to be capable of dehumidification with only little cooling, or virtually no cooling.

The invention resides in the combination, construction, arrangement and disposition of the various elements incorporated in an air-conditioning apparatus constructed in accordance herewith. The present invention will better be understood, and objects and important features other than those specifically enumerated above and hereinafter set forth, will become apparent when consideration is given to the following detailed description, which, when taken in conjunction with the annexed drawing, describes, discloses, shows and illustrates a preferred embodiment or embodiments of the present invention, and what is presently considered to be the best mode of practicing the principles thereof. Other embodiments or modifications may be suggested to those having the benefits of the teachings herein, and such other embodiments or modifications are intended to be reserved especially as they fall within the scope and spirit of the sub-joined claims.

Certain terminology will hereinafter be utilized in a relative sense in order to facilitate an understanding of the present invention. For example, a "heat transfer fluid" will hereinafter be distinguished from a "heat transfer medium." With respect to the "heat transfer fluid," it will hereinafter be referred to as having been "cooled," or "heated." The term "cool" or "cooled" heat transfer fluid is not intended to be interpreted as a fluid that has been "chilled," but is intended to mean only that heat picked up by this fluid has been dissipated by any suitable and conventional device so that, for example, during the summer months the temperature of this fluid will fall within a normal range, which, for example, may be between 80 and 120 degrees Fehrenheit. During the winter months, the heat transfer fluid is heated, again by any suitable and conventional device that may be found in a common hot water heating system, such as a boiler, boiler converter, or electric heating device.

Figure 1:
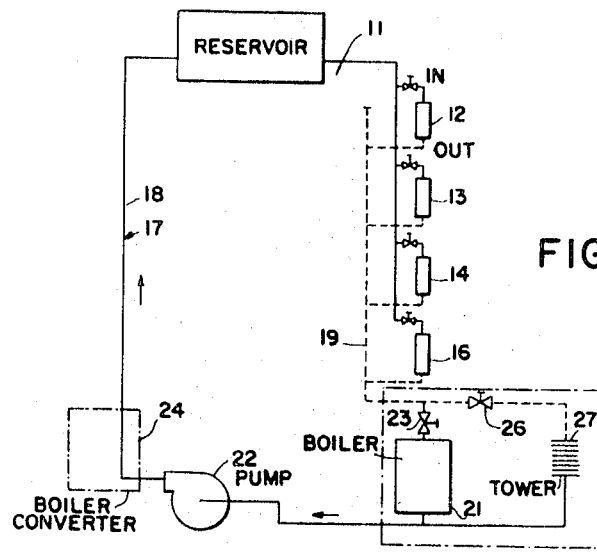
FIG. 1 is a schematic vertical elevational view of an air-conditioning apparatus constructed in accordance with the principles of the present invention.

With particular reference now to the drawings, and more specifically to FIG. 1, there is illustrated therein an exemplified structure to be air conditioned, such as a building 11. A series of air-conditioning unit 12, 13, 14, and 16 are provided, for example, one for each floor, one for each apartment, or one for each room or enclosure. While four units have been illustrated in the drawing, and will hereinafter be described in greater detail, this number is in no way intended as any limitation.

The air-conditioning apparatus of the present invention comprises a system of conduits or pipes comprising a conduit 17 for a heat transfer fluid, having a feed branch 18 and a return branch 19. A first heat exchanger, such as a boiler 21 is connected between the return branch 19 and the feed branch 18 of the fluid conduit 17. A pump 22 may be provided at the end of the return branch 19.

The heat transfer fluid to be circulated in the conduit 17 may be of any suitable type, and for example, may comprise a liquid which in most instances will be water. This may be supplied to the air-conditioning apparatus from any suitable source, such as a city or other municipal source. Any other suitable heat transfer fluid such as a gas or high-temperature liquid may also be used.

The units 12, 13, 14 and 16 are connected in parallel to the feed branch 18 and to the return branch 19, so that each unit will receive and discharge the heat transfer fluid.

When the conduit 17 is used to supply heat energy to the air-conditioning units, the heat transfer fluid will be passed through a flow control assembly or valve 23, and will then be heated by the heat exchanger or boiler 21.

When, on the other hand, the apparatus is used for cooling, the valve 23 will be closed, and in the return branch 19, the heat transfer fluid will pass through a flow control assembly or valve 26 and through a second heat exchanger, such as a cooling tower 27, and from there be returned to the pump 22 for recirculation. It will be understood that a three-way flow control assembly can be utilized in lieu of the valves 23 and 26. The second heat exchanger may be of any suitable type, and, for example, may comprise an air-coil (dry tower), an evaporative tower, or an "open" water tower with a heat exchanger.

The valve 26 and the cooling tower 27 are arranged in parallel with the valve 23 and the boiler 21. One of the valves 23 and 26 will be opened, and the other closed, thereby determining whether the heat transfer fluid by-passes the tower or the storage tank. It is within the scope of the present invention to utilize a boiler converter 24 in lieu of the boiler 21. The converter will be disposed on the output side of the pump 22 (as illustrated in phantom in FIG. 1). A storage tank may, in this instance, be disposed in the position occupied by the boiler 21. During a heating cycle, the heat transfer fluid will be heated by the converter 24, but during a cooling cycle, the heat transfer fluid will merely pass through the unheated converter.

Each of the air-conditioning units 12, 13, 14, and 16 comprises a housing 28 (FIG. 3), that may have in one side wall opening or louvres 29, 31 and 32. Each of these openings comprises one or more apertures. On the interior, each unit has a closed conduit 33 for a heat transfer medium, such as a refrigerant, for instance of the type known under the trademark "Freon." The conduit 33 comprises a condenser 34, a compressor 36, and an evaporator 37, and the heat transfer medium is circulated through these elements of the closed conduit 33 in a manner well known to those skilled in the art. The compressor may be driven by an individual electric motor 38, and there may also be provided motor fans (not shown).

In accordance with the principles of the present invention, the heat transfer fluid (the water, for example, flowing through the conduit 17) is delivered into each air conditioning unit through the medium of the feed branch 18, and into heat exchange relation with the heat transfer medium, flowing through the closed conduit 33. For example, when the heat transfer fluid (water for example) has been cooled, as through the medium of the tower 27, it will cause the condensation of the refrigerant or heat transfer medium flowing through each air-conditioning unit. On the other hand, however, when the heat transfer fluid has been heated, as through the medium of the heat exchanger or boiler 21, it will necessarily cause the refrigerant or heat transfer medium to be heated. It will be understood, however, that heating of the refrigerant or heat transfer medium within the limits of the instant space heating is in no way detrimental to commercial refrigerants.

Figure 2:
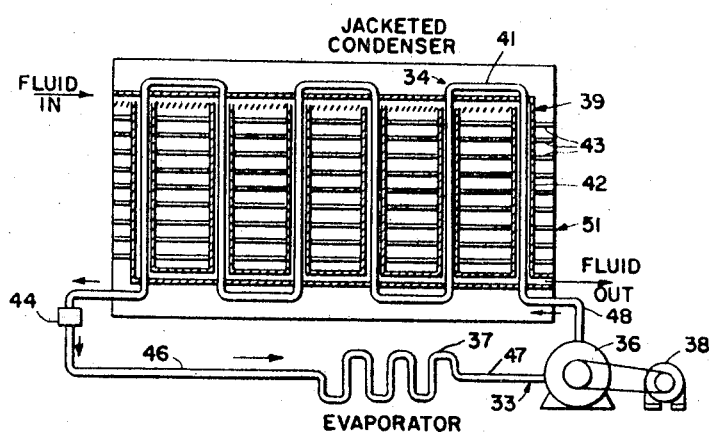
FIG. 2 is a detailed schematic sectional view, drawn to an enlarged scale, of one of the air-conditioning units comprising an element of the air-conditioning apparatus shown in FIG. 1.

For effective cooling, the heat transfer fluid is delivered into heat exchange relation with the condenser 34 of the closed conduit 33 to dissipate or remove heat from the heat transfer medium or refrigerant. In accordance with one of the preferred embodiments of the invention, this is accomplished by guiding the heat transfer fluid (water, for example) in a jacket 39 (FIG. 2) about at least a portion of a coil 41 of the condenser 34. The jacket 39 includes pipes 42 that surround some of the pipes of the coil 41 concentrically, and preferably the refrigerant or heat transfer medium and the heat transfer fluid (water, for example) flow in the same or opposite directions, as shown in FIG. 2. The structure 51, which includes the jacket 39 and the coil 41 furthermore comprises a series of parallel fins 43, which serve as means to reinforce the structure and to support the coils, and also to provide a large surface for heat dissipation. The conduit 33 further includes a valve or a constriction 44 for expansion of the refrigerant, enabling it to emerge as a mixture of liquid and vapor at a lower temperature, as is well known in the art. The conduit 33 also comprises a pipe 46 between the constriction 44 and the evaporator 37 which receives heat from the enclosure to be conditioned by reducing the temperature to the desired level, thus converting the remaining liquid to a vapor, a pipe 47 that leads from the evaporator 37 to the compressor 36, and a pipe 48 that connects the compressor 36 with the condenser coil 41. The evaporator 37 is also coiled, as is illustrated in FIG. 2.

Figure 3:
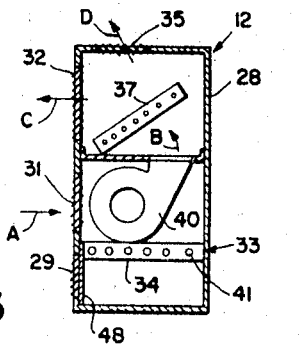
FIG. 3 is a schematic vertical sectional view of one of the air-conditioning units comprising an element of the apparatus shown in FIG. 1, illustrated in position for cooling and dehumidification.

In accordance with the embodiment of FIG. 3, air to be conditioned (heated or cooled) is drawn into the housing 28, through the second opening 31, as shown by an arrow A, from the space, such as a room in which the air conditioning unit is located. This may be accomplished in any suitable manner as through the medium of a fan or blower 40. The air in the housing 28 is then propelled as shown by arrow B to the coils of the evaporator 37, and is expelled back into the space or room through the opening 32, as shown by an arrow C. Alternatively, the air may be expelled upwardly in the direction of an arrow D through an opening 35 in the top wall of the housing 28. The air may be expelled through the openings 32 and 35, or through only one of these and the other be covered by a lid (not shown).

A damper or damper baffle 48 is guided on the interior of the housing 28 between a lower position (FIG. 3) wherein it covers the opening 29 and, respectively, an upper position (FIG. 4) wherein it covers the openings 31.

For cooling and dehumidification, the system will have a heat transfer fluid circulating in the conduit 17 that has been cooled through the medium of the heat exchanger or cooling tower 27, and the arrangement will be as illustrated in FIG. 3. The air is then drawn in and expelled as hereinbefore explained.

Figure 4:
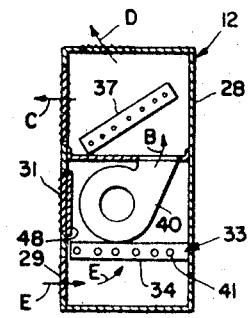
FIG. 4 is a schematic vertical sectional view, similar to FIG. 3, but showing the air-conditioning unit in position for either dehumidification or heating.
Figure 5:
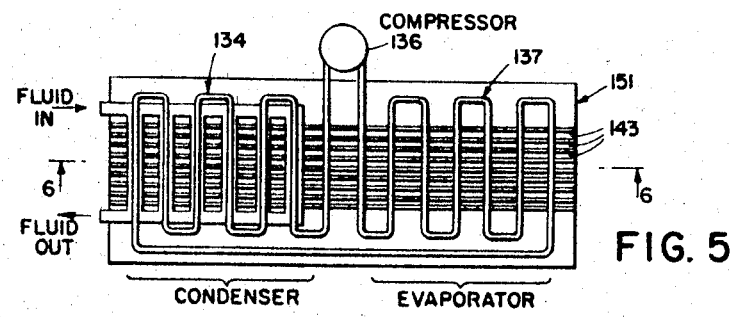
FIG. 5 is a schematic sectional view, drawn to an enlarged scale similar to FIG. 2, but showing a modification of the air-conditioning unit illustrated therein.

For dehumidification with only little cooling, or virtually no cooling, or for heating, the arrangement will be as illustrated in FIG. 4, wherein the damper baffle 48 is disposed to cover the opening 31, and air will be drawn in from the space or room through the opening 29 in accordance with an arrow E and be drawn past the coils 41 of the condenser 34, and be expelled past the evaporator 37 in accordance with the arrows B and C, or D similar to the foregoing. In the position of FIG. 4, in contradistinction to the cooling position of FIG. 3, the heat transfer fluid circulating through the conduit 33 will have been heated through the medium of the heat exchanger or boiler 21.

The air conditioning unit in the position of FIG. 4 may also be used for convection heating without using the blower, letting air circulate as indicated by the arrows E, B, and C, and circulating a heat transfer fluid in the conduit 33 that has been heated.

Figure 6:
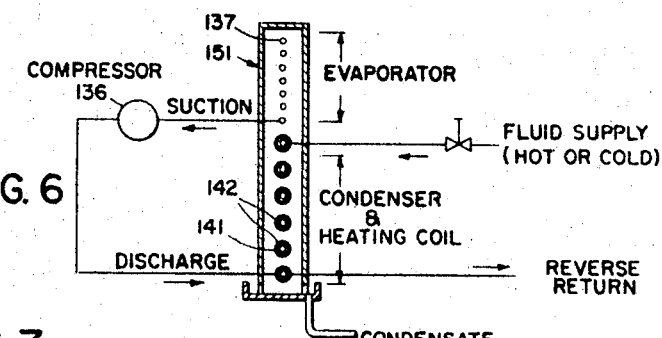
FIG. 6 is a fragmentary sectional view taken on the line 6—6 of FIG. 5.
Figure 7:
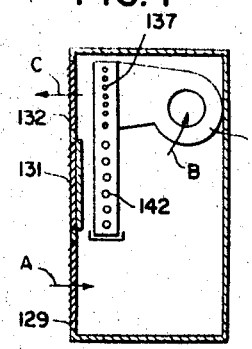
FIG. 7 is a schematic vertical sectional view of the air-conditioning unit illustrated in FIGS. 5 and 6, illustrated in position for cooling and dehumidification.
Figure 8:
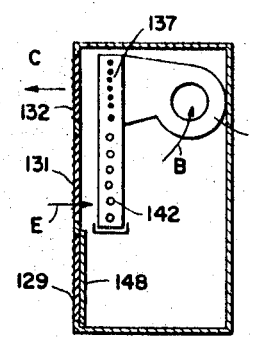
FIG. 8 is a schematic vertical sectional view of the air-conditioning unit illustrated in FIGS. 5 and 6, shown in position for either dehumidification or for heating.

In accordance with a preferred arrangements, illustrated in FIGS. 5-8, wherein like parts are indicated by like reference characters, but wherein the prefix "1" is added, the coils of the condenser 134 and of the evaporator 137 are in a single plane, and form part of a structure 151, and are interconnected and supported by the fins 143, which extend throughout the length of the combined condenser and evaporator coils. This arrangement has the advantage that when the combined structure 151 is mounted in the unit, as illustrated in FIGS. 6, 7, and 8, water condensate that may collect on the evaporator coils 137 during cooling operation of the unit will descend along the fins 143 and will cool the condenser 134 near the bottom of the structure 151, as the bottom is near the condenser and consequently during cooling operation is warm, as is well known to skilled artisans.

In the summer, the conduit will convey the heat transfer fluid, such as water, through the cooling tower 27, to effectuate its cooling. The compressor 36 will be actuated, and the present invention will air condition the air in the building 11 by reducing the temperature to the desired value. In the winter, the boiler 21 will heat the heat transfer fluid, the compressor 36 will be inactive, and the present invention will air condition the air by increasing the temperature to the desired value.

As shown in FIGS. 7 and 8, a damper baffle 148 is provided that may be shifted between an upper position (FIG. 7), wherein it covers the middle opening 131 and, respectively, a lower position (FIG. 8) wherein it covers the lower opening 129. For cooling and dehumidification, the baffle 148 will be in the upper position of FIG. 7 and the air will be drawn in through the evaporator coil 137 and expelled in accordance with the arrows A, B, and C. For dehumidification with little cooling, and for heating, the baffle 148 will be in the lower position of FIG. 8 and the air will be drawn in through the condenser coil 142, which now functions as a heating coil, and expelled through the coil 137, through which no heat transfer medium is flowing since the compressor 136 is inactive during the winter, in accordance with the arrows E, B, and C.

In accordance with the forgoing, it will now be understood that air-conditioning apparatus constructed in accordance with the principles of the present invention comprises a system of pipes or conduits, a plurality of heat exchangers disposed therewithin in parallel relationship with respect to one another, one of said heat exchangers being capable of heating a heat transfer fluid, and another of said heat exchangers being capable of cooling a heat transfer fluid, and at least one and even a plurality of air conditioning units. The heat transfer fluid to be circulated through said system of pipes or conduits, may be any suitable fluid, and for example may comprise water from any suitable source. This source may even be a city or other municipal water supply source. The air-conditioning units each comprise a compressor, a condenser coil, an expansion valve, and an evaporator coil. The air conditioning units, therefore, define a closed circulating system through which a heat transfer medium comprising any suitable refrigerant may be circulated. The condenser coil section of each air conditioning unit is jacketed so that the heat transfer fluid, which may comprise water, may be circulated in heat exchange relationship with the medium or refrigerant flowing therethrough. This may be accomplished in various ways, and for example, the condenser coil section of each air-conditioning unit may comprise, in effect, a tube within a tube. Accordingly, each air-conditioning unit is completely self-contained, and is capable of being individually controlled. In addition, the closed refrigerant system or conduit is particularly capable of being hermetically sealed, in any suitably manner, enabling each unit to be installed with facility, and without requiring special knowledge, tools or techniques. This is true since the completely self-contained air conditioning units of the present invention, comprising the hermetically sealed refrigerant conduits, can be installed in the same manner as a conventional hot water convector heater.

The present invention, as hereinbefore pointed out, requires only any suitable heat transfer fluid, which may comprise water from any suitable source. The temperature of the heat transfer fluid can vary, and may be as high as 230 degrees Fahrenheit. During cooling, it is only necessary that the temperature of the fluid be reduced to a value falling within a normal range, which may be between 80 to 120 degrees Fahrenheit. It is not necessary to reduce the temperature of the heat transfer fluid to a lesser value for unusually efficient cooling; that is, a "chilled" heat transfer fluid is not necessary. This avoids the necessity of utilizing a single centrally located chilling element, thus further avoiding the necessity of insulating the system of pipes or conduits, to preclude the development of condensation. Any condensation that forms in the air conditioning apparatus of this invention will develop on the evaporator coil of each air conditioning unit. This condensate may be handled with facility in any suitable manner, as for example, by a small drip tube through a wall into a flower bed, or a condensate line that is run to a drain or laundry tub.

Additionally, air-conditioning apparatus constructed in accordance with the principles of the present invention has many wide and divers applications. The apparatus may be installed in any type of construction, such as motels, apartments, factories, commercial offices and residential buildings. The apparatus is extremely practical and highly economical, irrespective of whether the installation is large or small, and is capable of rendering outstanding service and performance. This is true since each air-conditioning unit is, as hereinbefore pointed out, self-contained. Moreover, each unit is individually and completely automatically controllable to the selected temperature level. A malfunction in any one or more of the units does not effect the apparatus as a whole, nor any of the units thereof.

Still further, the air conditioning apparatus of this invention can be installed with complete facility. This is true since ambient or outside air is not required, and hence it can be installed in interior rooms or enclosures, and thus within interior partitions. The need of breaking through walls of existing buildings is, therefore, eliminated completely. The individual air-conditioning units can be combined with baseboard, commercial finned pipe, or other forms of radiation, where ever a building is only partially air-conditioned, or for conditioning of air in such interior enclosures as bathrooms, foyers, entrance areas, storage rooms, and the like. Accordingly, it will also be understood that the present air-conditioning apparatus can be installed in only a portion or portions of a building, any combination of rooms or floors, or can be installed in an entire structure.

Still further, existing structures having only hot water heating systems can readily and easily be converted to a complete air-conditioning apparatus of the present invention. This can be accomplished with a minimum amount of new piping, wall damage and "downtime" of the rooms because of the simple and economic construction of all of the elements of the apparatus, and particularly the individual units. It is not even necessary to utilize the heat exchanger 27, where this is not feasible. The air-conditioning units will operate with a heat transfer fluid, such as water, at city temperature, or a dependable on-site source thereof.

In view of each and everyone of the foregoing reasons, it will now be understood that an extremely efficient and flexibile air conditioning operation can be obtained by the present air-conditioning apparatus. Thus, since each of the air-conditioning units is completely self-contained, a programmed economical operation of heating and cooling may be achieved, since a thermostatic control may be incorporated in every enclosure or room. Accordingly, the only units that need be operated are those in rooms or enclosures that are occupied. In a residence, then, if only two enclosures are used at night, only those two units will be required. The remaining units may be shut off. Conversely, in the daytime, when the living area rooms are occupied, the sleeping area units can be shut down. In motels, hotels, high rise apartments, or commercial buildings, any of the enclosures or rooms, suites or floors that are vacant need not be air conditioned. It will be seen, therefore, that tremendous savings of fuel during the heating season can be achieved without fear of freeze-up. This is true since, even when the units are "off," constant circulation of the heat transfer fluid passing through the heat exchanger 21 provides heat in the rooms.

The present air-conditioning apparatus is unique in that some of the air-conditioning units can be "heating" while others are cooling when there is a cooling load on the structure. Though the full rated heating output will not be realized, it will be sufficient to answer the needs and requirements during the in-between seasons. Thus, as pointed out above, it is not necessary to reduce the temperature of the heat transfer fluid below a normal range, which may be between 80 and 120 degrees Fahrenheit. A temperature level within a normal range of 80 to 120 degrees Fahrenheit, for example, will be sufficient to dissipate the heat of the heat transfer medium flowing through the condenser section or coil of the individual air-conditioning unit. If the temperature level of the heat transfer fluid is between 100 and 110 degrees, then it is only necessary to deactivate the compressor of the unit, and change the position of the damper or baffle so that the air within the enclosure will pass about or through the coils of the condenser. Accordingly, the unit in one enclosure can be cooling the air, while the unit in an adjacent enclosure can be heating the air therewithin. The occupant of the room or enclosure, therefore, has the choice of heating or cooling during the spring and fall seasons, for example, whereas, in the typical central air-conditioning system, only the benefit of the temperature level of the heat transfer fluid being distributed at that particular time can be obtained. It is emphasized that substantially increased flexibility and independent control is obtained.

It will be understood that the individual air-conditioning units, namely, the units 12, 13, 14 and 16 can be constructed and arranged, in any suitable manner, to present the elements thereof as sub-assemblies. This results in a modulate construction enabling the complete chassis or the sub-assemblies to be individually removed, thus facilitating repair and replacement. In addition, the elements can be installed or positioned within the chassis, or housing, to enable accessibility from interiorally of the enclosure or room. One such sub-assembly may comprise the refrigeration system, which, as hereinbefore pointed out, comprises the condenser coil, the expansion valve or constriction, and the evaporator coil. These elements are preferably constructed as an hermetically sealed self-contained unit.

After reading the foregoing detailed description of the exemplary and illustrated forms of air-conditioning apparatus constructed in accordance with the principles of the present invention, it will be understood that the objects set forth hereinbefore have successfully been achieved. And, while the invention has been shown, illustrated, described and disclosed in terms of illustrated embodiments or modifications which it has assumed in practice, the scope of the invention should not be deemed to be limited thereby.

What is claimed is:

1. Air-conditioning apparatus comprising, in combination, a system of conduits for translating any suitable heat transfer fluid, such as water, and the like, therethrough; a plurality of heat exchangers disposed in said system of conduits; and at least one air-conditioning unit disposed in said system of conduits, and comprising, a single coil defining a condenser and heating coil; an evaporator coil; a compressor; and guide means disposed in heat exchange relationship with respect to at least a portion of said condenser or heating coil for guiding said heat transfer fluid in heat exchange relationship with respect to said heat transfer medium; said unit being so constructed and arranged as to define a plurality of paths therethrough for the air to be conditioned, one of said paths causing the air to flow through the condenser and evaporator coil, and an other path causing the air to by-pass said condenser coil and flow only through said evaporator coil, and comprising, at least one entrance and exit; and means for selectively directing the air along said plurality of paths; enabling the air within any one or more of a plurality of enclosures to be conditioned in an unusually efficient manner, irrespective of prevailing ambient conditions, whether the enclosure is interiorly or exteriorly located, and in the absence of requiring that a central chilling unit be used and the system of conduits be insulated because of the condensation resulting from the utilization thereof, and wherein said system of conduits comprising, a feed branch; and a return branch; said plurality of heat exchangers being positioned in said system of conduits in parallel fluid flow relationship with respect to one another; one of said heat exchangers being constructed and arranged to raise the temperature level of the heat transfer fluid, and an other of said heat exchangers being constructed and arranged to reduce the temperature level of said fluid.

2. Air-conditioning apparatus as defined in claim 1, wherein:
said air-conditioning unit is disposed in parallel relationship with respect to said feed and return branches; and wherein:
said condenser and heating coil, evaporator coil and compressor comprises a conduit that is closed and defines a refrigerant system capable of being hermetically sealed, enabling said heat transfer medium to be selectively continuously recirculated therethrough.

3. Air-conditioning apparatus as defined in claim 2, wherein:
the path of air flow through the condenser and evaporator coil is defined by said one entrance and exit;
said path of air flow by-passing said condenser coil and through said evaporator coil is defined by an other entrance, disposed in spaced relationship with respect to said one entrance, and said exit; and wherein:
said means for selectively directing the air along said plurality of paths comprises:
a damper element movable along a generally vertically disposed plane.

4. Air-conditioning apparatus as defined in claim 3, wherein:
said guide means comprises:
a jacket.

5. Air-conditioning apparatus as defined in claim 4, wherein:
said condenser and evaporator coils are disposed along a common plane.

6. Air-conditioning apparatus comprising, in combination; a system of conduits; a plurality of heat exchangers disposed in said system of conduits in parallel fluid flow relationship with respect to one another, and at least one air conditioning unit disposed in said system of conduits comprising, in turn, a single coil defining a condenser and heating coil, an evaporator coil, a compressor and guide means disposed in heat exchange relationship with respect to at least a portion of said condenser or heating coil for guiding said heat transfer fluid in heat exchange relationship with respect to a heat transfer medium wherein said condenser and heating coil, evaporating coil, compressor and guide means define a closed refrigerant conduit for said heat transfer medium capable of being hermetically sealed to enable said medium to be selectively continuously recirculated therethrough; and means for a heat transfer fluid that flow through said system to be directed through said air conditioning unit and selectively through said heat exchangers to have its temperature level reduced to within a normal range of approximately 80 degrees–120 degrees F. during the warm weather months, but not of necessity lower than said range, and increased to a value approximating as high as 230 degrees F. during the cold weather months by said heat exchangers, at least one of said heat exchangers comprising means for enabling reduction of the heat transfer fluid temperature level and at least another of said heat exchangers comprising means for enabling temperature level increase of said heat transfer fluid to provide a degree of thermal energy further enabling said apparatus to unusually efficiently condition the air within at least one enclosure, irrespective of prevailing ambient conditions, whether the enclosure is interiorly or exteriorly located, in the absence of requiring that a central chilling unit be used to chill the heat transfer fluid and the system of conduits be insulated because of the condensation resulting from the utilization thereof.

7. Air-conditioning apparatus as defined in claim 6, wherein:
said air-conditioning unit further comprises:
a housing constructed and arranged to define a plurality of paths therethrough for the air to be conditioned, one of said paths causing the air to flow through the condenser and evaporator coil, and the other path causing the air to by-pass said condenser coil and flow only through said evaporator coil.

8. Air-conditioning apparatus as defined in claim 7, wherein:
said housing comprises:
at least one entrance and exit; and
means for selectively directing the air along said plurality of paths.

9. Air-conditioning apparatus as defined in claim 8, wherein:
said system of conduits comprises:
a feed branch, and;
a return branch;
said plurality of heat exchangers being positioned in said system of conduits in parallel relationship with respect to one another;
one of said heat exchangers being constructed and arranged to raise the temperature level of the heat transfer fluid, and an other of said heat exchangers being constructed and arranged to reduce the temperature level of said fluid.

10. Air-conditioning apparatus as defined in claim 9, wherein:
said air conditioning unit is disposed in parallel relationship with respect to said feed and return branches.

11. Air-conditioning apparatus as defined in claim 10, wherein:
the path of air flow through the condenser and evaporator coil is defined by said one entrance and exit;
said path of air flow by-passing said condenser coil and through said evaporator coil is defined by an other entrance, disposed in spaced relationship with respect to said one entrance, and said exit; and wherein:
said means for selectively directing the air along said plurality of paths comprises:
a damper element.

12. Air-conditioning apparatus as defined in claim 11, wherein:
said guide means comprises:
a jacket 13. Air-conditioning apparatus as defined in claim 6, wherein:
sair condenser and evaporator coils are disposed along a common plane.

References Cited

UNITED STATES PATENTS

| | | | |
|---|---|---|---|
| 3,008,695 | 11/1961 | Van Melle | 165—50 |
| 2,715,514 | 8/1955 | Stair | 165—50 XR |
| 2,715,515 | 8/1955 | Stair | 165—50 XR |
| 2,739,792 | 3/1956 | Blum | 165—50 XR |
| 2,806,675 | 9/1957 | Conradi | 165—50 |
| 3,181,604 | 5/1965 | Kritzer | 165—22 |
| 3,235,000 | 2/1966 | Jacobs | 165—50 |

FRED C. MATTERN, Jr., Primary Examiner

M. ANTONAKAS, Assistant Examiner